(12) United States Patent
Yoshikawa et al.

(10) Patent No.: US 6,746,365 B2
(45) Date of Patent: Jun. 8, 2004

(54) TOROIDAL-TYPE CONTINUOUSLY VARIABLE TRANSMISSION

(75) Inventors: Tomonobu Yoshikawa, Kanagawa (JP); Yasuo Murakami, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/987,080

(22) Filed: Nov. 13, 2001

(65) Prior Publication Data

US 2002/0082133 A1 Jun. 27, 2002

(30) Foreign Application Priority Data

Nov. 14, 2000 (JP) .................... P. 2000-346996

(51) Int. Cl.[7] .............................................. F16H 15/38
(52) U.S. Cl. .................... 476/46; 384/492; 384/625; 148/326
(58) Field of Search ............... 476/40, 42, 46; 384/492, 569, 625, 907, 912, 913; 148/325, 326, 327

(56) References Cited

U.S. PATENT DOCUMENTS

| | | | | |
|---|---|---|---|---|
| 5,030,017 A | * | 7/1991 | Murakami et al. | 384/492 |
| 5,456,766 A | * | 10/1995 | Beswick et al. | 148/216 |
| 5,556,348 A | | 9/1996 | Kokubu et al. | 476/40 |
| 6,066,068 A | * | 5/2000 | Takemura et al. | 476/40 |
| 6,165,100 A | | 12/2000 | Mitamura et al. | 476/72 |
| 6,250,812 B1 | * | 6/2001 | Ueda et al. | 384/492 |
| 6,342,109 B1 | * | 1/2002 | Takemura et al. | 148/319 |

FOREIGN PATENT DOCUMENTS

| | | | |
|---|---|---|---|
| JP | 2-49411 | 12/1990 | |
| JP | 7-71555 | 3/1995 | ......... F16H/15/38 |
| JP | 9-79336 | 3/1997 | ......... F16H/15/38 |
| JP | 11-193855 | 7/1999 | ......... F16H/15/38 |

OTHER PUBLICATIONS

JIS Handbook, Japanese Standards Association, 2004, pp. 881–884.*
JIS Handbook, Japanese Standards Associateion, 2003, pp. 1840–1841.*
Enchiridion for Mechanical Engineering, 1987, p. B4–41.*

* cited by examiner

Primary Examiner—David A. Bucci
Assistant Examiner—Timothy McAnulty
(74) Attorney, Agent, or Firm—Sughrue Mion, PLLC

(57) ABSTRACT

The toroidal-type continuously variable transmission comprises an input shaft rotatably supported, an input side disk, an output side disk, a plurality of trunnions, a plurality of power rollers, and a plurality of thrust rolling bearings 32, in which the mutually opposed inner surfaces of the input side and output side disks are respectively formed as concave surfaces each having an arc-shaped section, the peripheral surfaces of the power rollers are formed as spherical-shaped convex surfaces, and the peripheral surfaces of the power rollers are contacted with the inner surfaces of the input side and output side disks. In the thus structured toroidal-type continuously variable transmission, each of the thrust rolling bearings 32 is made of high carbon chromium bearing steel and is also carbonitrided.

12 Claims, 2 Drawing Sheets

TOROIDAL-TYPE CONTINUOUSLY VARIABLE TRANSMISSION

BACKGROUND OF THE INVENTION

The present invention relates to a toroidal-type continuously variable transmission for use as an automatic transmission for a vehicle and, particularly, to a toroidal-type continuously variable transmission in which the durability of component parts thereof, that is, disks and power rollers is enhanced.

Conventionally, as a toroidal-type continuously variable transmission, there is known a transmission which has such a structure as shown in FIG. 1.

Within a housing (not shown), an input side disk 1 and an output side disk 2 are disposed on an input shaft 3 which is rotatably supported in the interior of the housing, in such a manner that they are concentric with and opposed to each other. The input shaft 3 is penetrated through the axial core portion of a toroidal transmission part including the input side and output side disks 1 and 2. A loading cam 4 is disposed on one end of the input shaft 3. The loading cam 4 is structured such that it can transmit the power (rotational force) of the input shaft 3 to the input side disk 1 through a cam roller 5. The input side and output side disks 1 and 2 are concentric with each other with their respective inner surfaces opposed to each other. The input side and output side disks 1 and 2 have substantially the same shape, while these opposed surfaces are formed as toroidal surfaces which cooperate together in forming a substantially semicircle.

Within a toroidal cavity defined by the toroidal surfaces of the input side and output side disks 1 and 2, a pair of power roller bearings 6 and 7 are disposed in such a manner that they are contacted with the input side and output side disks 1 and 2. By the way, the power roller bearing 6 is composed of a power roller 6a (which corresponds to an inner ring forming the power roller bearing 6) which is allowed to roll on the toroidal surfaces of the input side and output side disks 1 and 2, an outer ring 6b, and a plurality of rolling bodies (steel balls) 6c. On the other hand, the power roller bearing 7 is composed of a power roller 7a (which corresponds to an inner ring forming the power roller bearing 7) which is allowed to roll on the toroidal surfaces of the input side and output side disks 1 and 2, an outer ring 7b, and a plurality of rolling bodies (steel balls) 7c.

That is, the power roller 6a serves also as an inner ring which is a component of the power roller bearing 6, while the power roller 7a serves also as an inner ring which is a component of the power roller bearing 7. In this structure, the power roller 6a is mounted pivotally and rotatably on a trunnion 10 through a pivot shaft 8, the outer ring 6b and the plurality of rolling bodies 6c on the trunnion 10 swinging about a support shaft 20 disposed at a position which is perpendicular to an axial line of the input shaft 3 and does not intersect the axial line thereof (hereinafter, this physical relationship is referred as " a twisted position. The power roller 6a includes a peripheral surface which is formed as a spherical-shaped convex surface. The power roller 6a is supported in such a manner that it is able to inclinedly roll about shift shafts respectively supported on the trunnions and serving as the centers of the toroidal surfaces of the input side and output side disks 1 and 2. On the other hand, the power roller 7a is mounted pivotally and rotatably on a trunnion 11 through a pivot shaft 9, the outer ring 7b and the plurality of rolling bodies 7c, while the trunnion 11 can be oscillated about the pivot shaft 9 disposed at a twisted position with respect to the input shaft 3. The power roller 7a includes a peripheral surface which is formed as a spherical-shaped convex surface. The power roller 7a is supported in such a manner that it is able to roll inclinedly about shift shafts 0 respectively supported on the trunnions and serving as the centers of the toroidal surfaces of the input side and output side disks 1 and 2. And, to the contact surfaces of the input side and output side disks 1 and 2 with respect to the power rollers 6a and 7a, there is supplied lubricating oil which is large in viscous frictional resistance. Power input to the input side disk 1 can be transmitted to the output side disk 2 through the lubricating oil film, power roller 6a and power roller 7a.

By the way, the input side and output side disks 1 and 2 are set independent of the input shaft 3 through a needle roller 12 (that is, they are not influenced directly by the power of the rotary shaft or input shaft 3). On the output side disk 2, there is disposed an output shaft 14 which is not only arranged parallel to the input shaft 3 but also rotatably supported by the housing (not shown) through angular bearings 13. In this toroidal-type continuously variable transmission 20, the power of the input shaft 3 is transmitted to the loading cam 4. In case where the loading cam 4 is rotated due to such power transmission, the power of the loading cam 4 produced by the rotation thereof is transmitted through the cam roller 5 to the input side disk 1, thereby causing the input side disk 1 to rotate. Further, the power of the input side disk 1 produced by the rotation thereof is then transmitted through the power rollers 6a and 7a to the output side disk 2. As a result of this, the output side disk 2 is rotated integrally with the output shaft 14.

In the case of transmission, the trunnions 10 and 11 are moved by a slight distance in the directions of the shift shafts 0, respectively. That is, due to the movements of the trunnions 10 and 11 in the axial direction thereof, the intersection between the rotation axes of the power rollers 6a, 7a and the axes of the input side and output side disks 1 and 2 are shifted slightly from each other. As a result of this, the balance between the rotational peripheral speeds of the power rollers 6a, 7a and the rotational peripheral speed of the input side disk 1 is lost. In addition, due to the component of the rotation drive force of the input side disk 1, the power rollers 6a, 7a are inclinedly rotated around the shift shafts 0, respectively. Therefore, the power rollers 6a, 7a are inclinedly rotated on the curved surfaces of the input side and output side disks 1 and 2, with the result that the speed ratio is changed, thereby accelerating or decelerating the speed of the vehicle.

As a toroidal-type continuously variable transmission having the above structure, for example, there is known a conventional transmission which is disclosed in Japanese Utility Model Examined Publication No. Hei. 2-49411U. Also, as the examples of the above-mentioned input side disk, output side disk and power roller bearings, there are conventionally known disks and bearings which, as set forth in [NASA Technical note NASA ATN D-8362], use AISI52100 (JIS SUJ2 which corresponds to a high carbon chromium bearing). Further, disks and bearings which, as disclosed in Japanese Patent Unexamined Publication No. Hei. 9-79336, are produced by carbonitriding SCM420, that is, steel for machine-structural purposes containing Cr.

In the above-mentioned conventional toroidal-type continuously variable transmission, when it is driven, there are produced high contact pressures respectively between the input side disk and power roller bearings, between the output side disk and power roller bearings, and between the power roller inner and outer rings and rolling bodies. These high contact pressures give rise to the shortened rolling fatigue lives of the raceway surfaces. Also, an increase in the temperatures of the contact surfaces due to generation of heat in the lubricating oil (traction oil) flowing through between the input side and output side disks and power roller bearings as well as through between the power roller raceway surfaces and rolling bodies gives rise to the lowered surface hardness of the disks and bearings, thereby shortening the rolling fatigue lives of the disks and bearings.

In view of the above circumstances, for the purpose of enhancing the rolling fatigue lives of the disks and power roller bearings shortened due to the above-mentioned high contact pressures and high temperatures, conventionally, the input side and output side disks and the inner rings or outer rings of the power roller bearings are carburized or carbonitrided, to thereby prevent the reduction in the high temperature hardness of the surfaces thereof. To obtain sufficient surface hardness, it is necessary to enhance the carbon concentration and nitrogen concentration of the neighboring portions of the surfaces sufficiently. Further, in the above-mentioned conventional toroidal-type continuously variable transmission, there is a fear that there can be generated a high shearing stress in the interior portions of the rolling bodies and thus there can occur cracks at and from the neighboring portions of the maximum shearing stress positions, thereby causing the raceway surfaces to exfoliate. In view of this, in Japanese Patent Unexamined Publication No. Hei. 7-71555, there is provided an effective hardened layer having a depth in the range of 2.0 mm–4.0 mm, thereby obtaining a life extension effect.

Also, in Japanese Patent Unexamined Publication No. Hei. 9-79336, the material hardness at the maximum shearing stress position is set at Hv700 or more, thereby securing a life extension effect. To obtain the above life extension effects, it is necessary to enforce a carbonizing treatment or a carbonitriding treatment on the disks and bearings for a very long time but this raises a problem that the costs necessary for the thermal treatments are large. Further, to secure sufficient quenching hardness, it is necessary to use quenching oil which has a good quenching characteristic: that is, this arises a problem that the material is greatly deformed when it is quenched.

SUMMARY OF THE INVENTION

The present invention aims at eliminating the above drawbacks found in the conventional toroidal-type continuously variable transmissions. Accordingly, it is an object of the invention to provide a toroidal-type continuously variable transmission in which a thrust rolling bearing is made of high carbon chromium bearing steel and is carbonitrided in the surface thereof to thereby provide sufficient durability when compared with the conventional toroidal type continuously variable transmissions.

In attaining the above object, according to the invention, there is provided a toroidal-type continuously variable transmission, comprising: an input shaft rotatably supported; an input side disk rotatable together with the input shaft and including an inner surface formed as a concave surface having an arc-shaped section; an output side disk including an inner surface formed as a concave surface having an arc-shaped section, the output side disk being disposed concentrically with the input side disk with the inner surface thereof opposed to the inner surface of the input side disk; a plurality of trunnions respectively oscillatable about their associated pivot shafts disposed at twisted positions to the input shaft; a plurality of shift shafts respectively supported on the trunnions; a plurality of power rollers each including a peripheral surface formed as a spherical-shaped convex surface, the power rollers being rotatably supported on the peripheries of the shift shafts while they are disposed on the inner surfaces of the trunnions and also are interposed between and held by the input side and output side disks; and, a plurality of thrust rolling bearings respectively interposed between the outer peripheral surfaces of the power rollers and the inner surfaces of the trunnions for supporting thrust loads to be applied to the power rollers, wherein each of the thrust rolling bearings is made of high carbon chromium steel and is carbonitrided.

In the preferable embodiment of the present invention, each of the thrust rolling bearings may include:

an inner ring raceway formed in the outer peripheral surface of the power roller; and an outer ring disposed inside the trunnion and having an outer ring raceway, wherein the outer ring is made of high carbon chromium steel and is carbonitrided.

According to a second aspect of the invention, each thrust rolling bearing, preferably, may be structured such that the surface carbon concentration thereof is set in the range of 0.95–1.4% and the surface nitrogen concentration thereof is set in the range of 0.05–0.4%.

Also, according to a third aspect of the invention, each thrust rolling bearing, preferably, may be structured such that the surface hardness thereof is set at Hv650 or more.

Further, according to a fourth aspect of the invention, each thrust rolling bearing, preferably, may be structured such that the retained austenite is in the range of 20% to 45%.

Still further, according to a fifth aspect of the invention, each thrust rolling bearing, preferably, may be structured such that the surface residual compressive stress thereof is set in the range of −200 to −1800 MPa.

Yet further, according to a sixth aspect of the invention, each power roller, preferably, may be made of steel for machine-structural purposes having a carbon concentration in the range of 0.15–0.5% and the present steel may be carbonized or carbonitrided.

With use of the above-mentioned thrust rolling bearings, not only there can be obtained a toroidal-type continuously variable transmission having sufficient durability, but also a bearing of a stable quality can be obtained at a lower cost than the conventional bearing.

DETAILED DESCRIPTION OF THE PREFERRED EMBODIMENTS

Now, description will be given below in more detail of a toroidal-type continuously variable transmission according to the invention.

Figure 2:
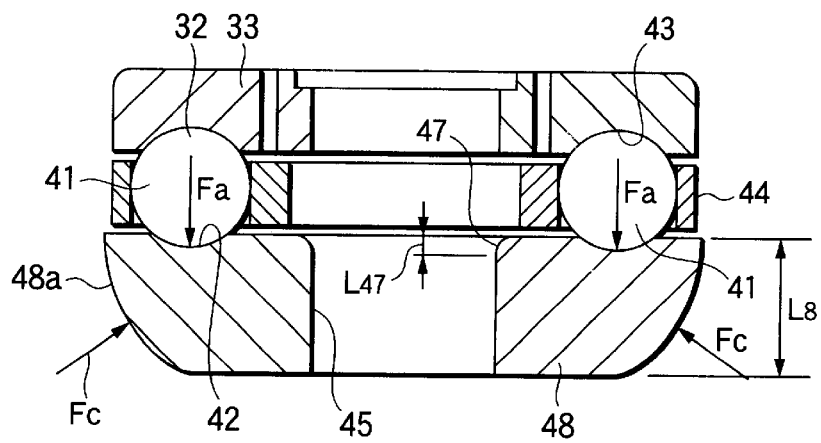
FIG. 2 is an explanatory view of the main portions of a toroidal-type continuously variable transmission according to the invention.

FIG. 2 shows the main portions of a toroidal-type continuously variable transmission according to the invention;

that is, a power roller 48, and a thrust ball bearing 32 which is a thrust rolling bearing for supporting a thrust load to be applied to the power roller 48. In the thrust ball bearing 32, between an inner ring raceway 42 formed in the outer surface (in FIG. 1, upper surface) of the power roller 48 and an outer ring raceway 43 formed in the inner surface (in FIG. 1, lower surface) of an outer ring 33 disposed along the inner surface of a trunnion (not shown), there are rollably interposed a plurality of balls 41, 41 which are respectively held by a circular-ring shaped retainer 44. And, the peripheral surfaces 48a of the power rollers 48 are contacted with the inner surfaces 2a, 4a of input side and output side disks 2 and 4 to thereby allow power transmission between the two disks 2 and 4.

The outer ring 33 is made of high carbon chromium bearing steel and is carbonitrided. Here, in the carbonitriding treatment, preferably, the surface carbon concentration may be set in the range of 0.95–1.4% and the surface nitrogen concentration may be in the range of 0.05–0.4%. Also, the surface hardness after quenching and tempering may preferably be set at Hv650 or more. Further, the retained austenite may preferably be set in the range of 20%–45%. Still further, the surface residual compressive stress may preferably be set in the range of −200 to −1800 MPa.

The reason why, in the power roller 48, as described above, the steel for machine-structural purposes is carbonized or carbonitrided to thereby form the surface hardened layer is as follows.

Figure 1:
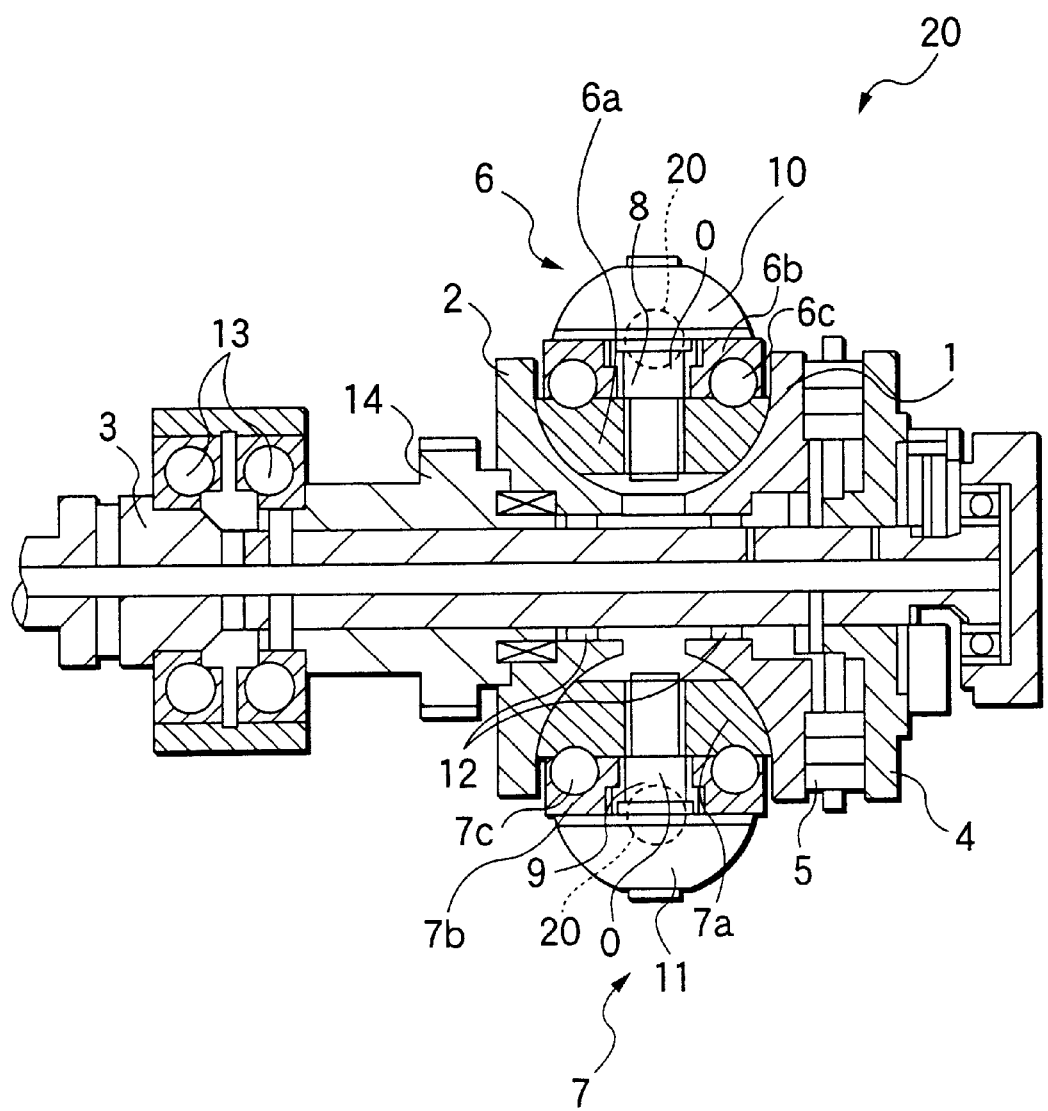
FIG. 1 is an explanatory view of a toroidal-type continuously variable transmission.

In the power roller 48, the traction surface 48a is given a normal force Fc from the input side and output side disks. At the same time, in the power roller 48, the inner ring raceway 42 is given a normal force Fa from the balls 41. In FIG. 1, the vertical-direction component of the normal force Fc balances with the normal force Fa, whereas the horizontal-direction component of the normal force Fc acts as a force which crushes the power roller 48. Since the power roller 48 is rotated together with the input side and output side disks, on the inside diameter sides 45, 47 of the power roller 48, there are applied an compressive stress and a tensile stress repeatedly.

The repetitive stresses can cause the power roller 48 to break. In order to prevent such breakage, the power roller 48 is carbonized or carbonitrided to enhance the surface hardness thereof, thereby being able not only to enhance the fatigue strength thereof but also to control an increase in the hardness of the core portion thereof, so that the progressing speed of cracks produced therein can be lowered to thereby prevent the breakage of the power roller 48. Also, in some cases, the inside diameter sides 45, 47 of the power roller 48 are shot-peened to provide a residual compressive stress, thereby being able to enhance the breakage strength thereof.

Also, in the case of the outer ring 33 as well, similarly to the power roller 48, the steel for machine-structural purposes is carbonized or carbonitrided. The reason for this is that the power roller 48 and outer ring 33 are assumed to form an integrated bearing and are manufactured accordingly. However, according to the analysis of the results of many durability tests conducted so far, the damage mode of the power roller 48 is limited to the breakage of the power roller 48 which starts at and from the inside diameter side thereof, the exfoliation of the traction surface 48a, and the exfoliation of the raceway surface 42; and, on the other hand, the damage mode of the outer ring 33 is limited only to the exfoliation of the raceway surface 43. Thus, in the case of the outer ring 33, differently from the power roller 48, there may be enforced a treatment which can enhance the exfoliation life of the raceway surface 43.

Here, as the cause of the exfoliation, there can be pointed out the generation of cracks starting at and from inclusions existing in the interior of the bearing, the change of the structure of the steel due to the rolling fatigue, and impressions caused by the biting-in of foreign substances such as iron powder contained in the lubricating oil.

In order to control the exfoliation starting at and from the interior of the bearing, the inclusions in the steel may be reduced and the hardness of the interior of the steel may be enhanced. Referring to the reduction in the inclusions, as known widely, in case where the carbon concentration in the steel is enhanced, the purity of the steel can be enhanced as well as the hardness of the interior of the steel can also be enhanced. Therefore, according to the invention, there is used high carbon chromium bearing steel. Also, in order to prevent the exfoliation caused by the impressions due to the biting-in of the foreign substances, it is necessary to enhance the quantity of the surface retained austenite. Thus, the surface of the high carbon chromium bearing steel is carbonitrided to thereby enhance the quantity of the surface retained austenite.

Here, in case where the surface carbon concentration is set in the range of 0.95–1.4% and the surface nitrogen concentration is set in the range of 0.05–0.4%, there can be obtained a longer life. Also, in case where the retained austenite increases, the hardness is lowered. However, by setting the hardness at Hv650 or more, the impressions are made difficult to occur, which makes it possible to obtain a life extension effect. Further, by setting the retained austenite in the range of 20% to 45%, in the steel surface, there can be obtained a stress relieving effect around the impressions, which can also provide a life extension effect. Still further, by setting the surface residual compressive force in the range of −200 to −1800 MPa, there can be obtained a life extension effect.

Embodiments

Now, description will be given below of embodiments according to the invention. By the way, the basic structure of a toroidal-type continuously variable transmission according to the invention is similar to the structure shown in FIG. 1. However, the material and heat treatment of the outer ring of the power roller used in the present toroidal-type continuously variable transmission are different from those in the conventional toroidal-type continuously variable transmission.

Figure 3:
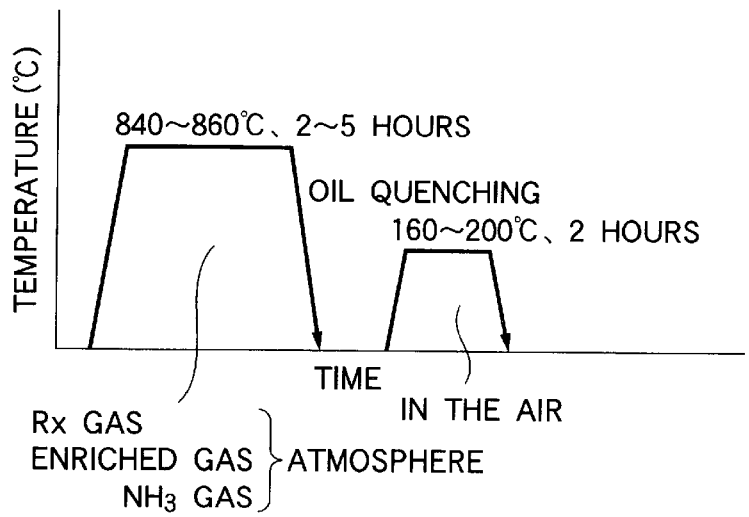
FIG. 3 is a heat treatment characteristic view when SUJ2, that is, high carbon chromium bearing steel, is used; and, FIG. 4 is a heat treatment characteristic view when steel for machine-structural purposes, that is, SCM420 or SCM435 (JIS B 4105) is used.

Of high carbon chromium bearing steel, SUJ2 (JIS G 4805) was used and such a heat treatment as shown in FIG. 3 was enforced on the SUJ2, whereby the outer ring of the power roller was manufactured. As the input side and output side disks and power rollers, there were used conventional products (mass-produced products). Also, as the outer rings of the power rollers of comparison examples, there were also used conventional products but, in these outer rings, there was used steel for machine-structural purposes, SCM420 or SCM435 (JIS G 4105) and such a heat treatment as shown in FIG. 4 was enforced on the present steel.

In the following table 1, there are shown the materials and heat-treated quality of the present embodiments and comparison examples.

TABLE 1

Figure 4:
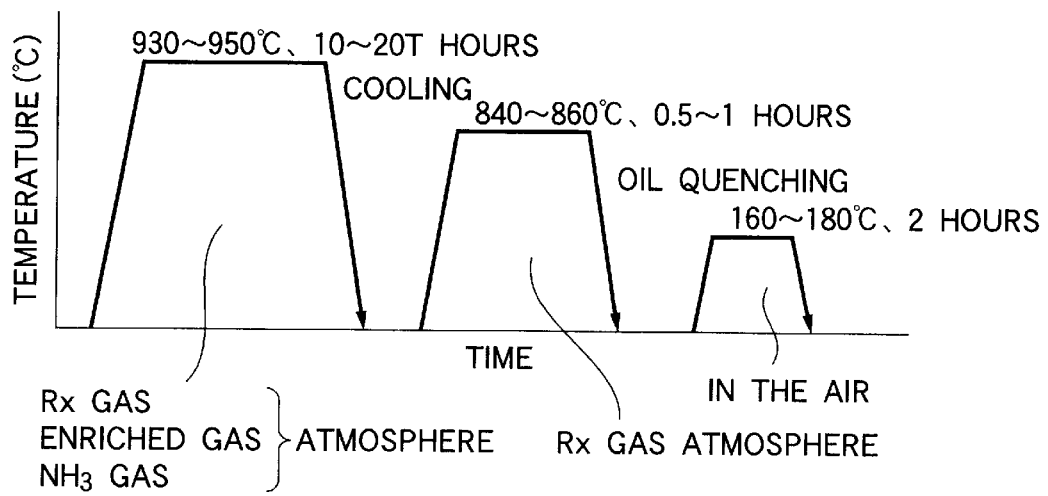

|  |  | Materials | Heat treatment | Surface carbon concentration | Surface nitrogen concentration | Surface hardness | Retained austenite | Residual stress |
|---|---|---|---|---|---|---|---|---|
| Embodiments | 1 | SUJ2 | FIG. 3 | 0.98 | 0.18 | 722 | 33 | −920 |
|  | 2 | SUJ2 | FIG. 3 | 1.38 | 0.09 | 743 | 38 | −400 |
|  | 3 | SUJ2 | FIG. 3 | 1.05 | 0.05 | 732 | 36 | −1050 |
|  | 4 | SUJ2 | FIG. 3 | 0.99 | 0.38 | 726 | 41 | −1030 |
|  | 5 | SUJ2 | FIG. 3 | 1.03 | 0.11 | 654 | 29 | −830 |
|  | 6 | SUJ2 | FIG. 3 | 1.12 | 0.06 | 763 | 22 | −1400 |
|  | 7 | SUJ2 | FIG. 3 | 0.97 | 0.33 | 697 | 44 | −990 |
|  | 8 | SUJ2 | FIG. 3 | 1.21 | 0.23 | 734 | 38 | −240 |
|  | 9 | SUJ2 | FIG. 3 | 1.24 | 0.29 | 755 | 32 | −1760 |
|  | 10 | SUJ2 | FIG. 3 | 1.22 | 0.21 | 760 | 32 | −1100 |
| Comparison Examples | 1 | SUJ2 | FIG. 3 | 1.50 | 0.08 | 780 | 33 | −740 |
|  | 2 | SUJ2 | FIG. 3 | 1.28 | 0.03 | 748 | 26 | −600 |
|  | 3 | SUJ2 | FIG. 3 | 1.15 | 0.46 | 755 | 42 | −770 |
|  | 4 | SUJ2 | FIG. 3 | 0.96 | 0.06 | 639 | 26 | −1260 |
|  | 5 | SUJ2 | FIG. 3 | 1.08 | 0.08 | 763 | 14 | −750 |
|  | 6 | SUJ2 | FIG. 3 | 0.98 | 0.38 | 698 | 52 | −640 |
|  | 7 | SUJ2 | FIG. 3 | 1.01 | 0.23 | 726 | 28 | −50 |
|  | 8 | SCM420 | FIG. 4 | 0.98 | 0.12 | 743 | 38 | −1200 |
|  | 9 | SCM435 | FIG. 4 | 1.03 | 0.19 | 754 | 36 | −830 |

In the following table 2, there are shown the 90% remaining lives ($L_{10}$) of the embodiments and comparison examples found by test 1, 2, and a unit durability test.

TABLE 2

|  |  | Test 1 (hr) | Test 2 (hr) | Unit durability test |
|---|---|---|---|---|
| Embodiments | 1 | 148 | 83 | Not damaged in 100 hrs |
|  | 2 | 155 | 90 | Not damaged in 100 hrs |
|  | 3 | 160 | 87 | Not damaged in 100 hrs |
|  | 4 | 153 | 95 | Not damaged in 100 hrs |
|  | 5 | 138 | 78 | Not damaged in 100 hrs |
|  | 6 | 167 | 76 | Not damaged in 100 hrs |
|  | 7 | 140 | 93 | Not damaged in 100 hrs |
|  | 8 | 153 | 89 | Not damaged in 100 hrs |
|  | 9 | 164 | 82 | Not damaged in 100 hrs |
|  | 10 | 171 | 88 | Not damaged in 100 hrs |
| Comparison Examples | 1 | — | — |  |
|  | 2 | 83 | 77 | Exfoliation occurred in power roller outer ring raceway surface in 93 hrs. |
|  | 3 | — | — |  |
|  | 4 | 65 | 75 | Exfoliation occurred in power roller outer ring raceway surface in 84 hrs. |
|  | 5 | 154 | 32 | Not damaged in 100 hrs |
|  | 6 | 76 | 93 | Exfoliation occurred in power roller outer ring raceway surface in 76 hrs. |
|  | 7 | 98 | 88 | Exfoliation occurred in power roller outer ring raceway surface in 74 hrs. |
|  | 8 | 137 | 94 | Not damaged in 100 hrs |
|  | 9 | 145 | 90 | Not damaged in 100 hrs |

Further, in the following table 3, there are shown the expected values of the sizes of the inclusions in the various kinds of steel that were used in the embodiments and comparison examples, while the expected values were calculated according to a relative extrema statistic method which is disclosed in U.S. Pat. No. 6,165,100 (DE 198 51 876 A1).

TABLE 3

$\sqrt{area_{max}}$ ($\mu$m) according to a relative extrema statistic method when S = 30000 mm$^2$.

| SUJ2 | 18 |
|---|---|
| SCM420 | 32 |
| SCM435 | 29 |

Next, the power roller outer rings of the embodiments 1–10 and comparison examples 1–9 were combined with mass-produced power roller inner rings to thereby produce power roller bearings. Here, the comparison examples 8 and 9 have the same specifications as the conventional steel.

With an axial-direction load applied to the thus produced power roller bearing as a single member, durability tests were conducted under the following conditions:

Test 1

Input shaft speed: 2000 r.p.m.

Axial load: 58800 N

Oil used: Traction oil

Oil supply temperature:: 120° C.

Test 2

Input shaft speed: 2000 r.p.m.

Axial load: 39200 N

Oil used: Traction oil

Oil supply temperature: 100° C.

Iron powder:

Size: 70–147 $\mu$m

Hardness: HV500–600

Quantity: 400 ppm

The test 1 is a durability test which is conducted under a clean lubricating condition where no foreign substance such as iron powder is contained in lubricating oil; and, the test 2 is a durability test which is conducted under a foreign-substance mixed lubricating condition where iron powder is contained in lubricating oil.

In the test 1, the exfoliation means the exfoliation that starts in and from the interior of the steel due to the contact stress thereof; and, in the test 2, the exfoliation means the exfoliation that starts at and from impressions caused by the biting of foreign substances into the contact surface. Also, in both of the tests 1 and 2, the embodiments and comparison examples were tested ten times each and the observed states thereof were put in order according to the Weibull distribution. The test results are expressed by the values of the 90% remaining lives ($L_{10}$).

By the way, in the case of the comparison example 1, when the micro structures of the bearing was observed after completion of the bearing, a pro-eutectoid state was observed on the raceway surface thereof and, therefore, no test was conducted on the comparison example 1. The reason for the existence of the pro-eutectoid state seems to have been that the comparison example 1 had a high surface carbon concentration of 1.50%.

In the case of the comparison example 3, the grindability thereof was excessively inferior to the other examples and the surface shape and roughness thereof were below the standard. For these reasons, no test was conducted on the comparison example 3. The reason for the above seems to have been that the comparison example 3 had a high surface nitrogen concentration of 0.46%. According to our experiences, in case where the nitrogen concentration of steel exceeds 0.4%, the grindability of the steel is lowered. The above observation proved this.

In the test 1, the embodiments 1–10 and comparison examples 8, 9 were respectively observed such that the 90% remaining lives ($L_{10}$) thereof were in the range of 137 to 171 hrs., that is, they had long lives. Here, when the comparison examples 8, 9 and the embodiments 1–10 are compared with each other, there can be found a tendency that the embodiments are slightly longer in the lives than the comparison examples. The reason for this seems that the embodiments are made of high carbon steel and thus are slightly better in purity than the comparison examples.

In the case of the comparison example 2, there was observed a short life. The reason for this seems that, since the comparison example 2 has a low surface nitrogen concentration of 0.03%, the hardness thereof under the high temperature condition of the test environment is lowered. Also, the reason for the short life of the comparison example 4 seems that it has low hardness of Hv639.

In the case of the comparison example 6, there was observed a short life. The reason for this seems that, because it has a high percentage, that is, 52% of retained austenite, in the test, the resolution of the retained austenite progresses to thereby cause the lowered hardness of the comparison example 6. Also, the reason for the short life of the comparison example 7 seems that it has a low residual stress of −50 MPa.

Under the foreign substance mixed lubricating condition in the test 2, the embodiments 1–10 were observed that their durability was equivalent to that of the comparison examples 8, 9. Also, the comparison examples 2, 4, 6 and 7 could obtain similar durability. However, in the case of the comparison example 5 having a 14% of retained austenite, the reduced life thereof was observed.

Next, while a toroidal-type continuously variable transmission unit was assembled using the embodiments and comparisons, a durability test was conducted under the following conditions of the test 3. The present durability test was conducted until damage was caused in any portion of the unit or until 100 hrs. passed, and the test was stopped at the then time.

Test 3
Input shaft speed: 4000 r.p.m.
Input torque: 350 Nm
Oil used: Traction oil
Oil supply temperature: 100° C.

In the test 3, the embodiments 1–10 and comparison examples 8, 9 were respectively observed such that they were not damaged in 100 hrs. On the other hand, in all of the comparison examples 2, 4, 6 and 7, exfoliations occurred in the outer ring raceway surfaces of the power rollers thereof before 100 hrs. passed.

As has been described heretofore in detail, according to the invention, since the thrust rolling bearing is made of high carbon chromium bearing steel and is also carbonitrided, there can be secured durability equivalent to or higher than the conventional thrust rolling bearing. Thanks to this, there can be provided a toroidal-type continuously variable transmission which can shorten the time for the heat treatment there of down to one third of the time necessary for the conventional heat treatment, thereby being able to reduce the costs of the heat treatment.

What is claimed is:

1. A toroidal-type continuously variable transmission, comprising:

an input shaft rotatably supported;

an input side disk rotatable together with said input shaft and including an inner surface formed as a concave surface having an arc-shaped section;

an output side disk including an inner surface formed as a concave surface having an arc-shaped section, said output side disk being disposed concentrically with said input side disk in such a manner that said inner surface thereof is opposed to said inner surface of said input side disk;

a plurality of trunnions respectively swingable about their associated support shafts disposed at twisted positions to said input shaft;

a plurality of shift shafts respectively supported on said trunnions;

a plurality of power rollers each including a peripheral surface formed as a spherical-shaped convex surface, said power rollers being rotatably supported on the peripheries of said shift shafts while they are disposed on the inner surfaces of said trunnions and are also interposed between and held by said input side and output side disks; and, a plurality of thrust rolling bearings respectively interposed between the outer peripheral surfaces of said power rollers and the inner surfaces of said trunnions for supporting thrust loads to be applied to said power rollers, wherein each of said thrust rolling bearings is made of high carbon chromium bearing steel, including a carbon content in a range of 0.95% to 1.10%, and is carbonitrided.

2. A toroidal-type continuously variable transmission as set forth in claim 1, wherein said thrust rolling bearing is structured such that the surface carbon concentration thereof is set in the range of 0.95–1.4% and the surface nitrogen concentration thereof is set in the range of 0.05–0.4%.

3. A toroidal-type continuously variable transmission as set forth in claim 2, wherein said thrust rolling bearing is structured such that the surface hardness thereof is set at Hv650 or more.

4. A toroidal-type continuously variable transmission as set forth in claim 3, wherein said thrust rolling bearing is structured such that the retained austenite is in the range from 20% to 45%.

5. A toroidal-type continuously variable transmission as set forth in claim 4, wherein said thrust rolling bearing is structured such that the surface residual compressive stress is set in the range of −200 to −1800 MPa.

6. A toroidal-type continuously variable transmission as set forth in claim 3, wherein said power roller is made of steel for machine-structural purposes having a carbon concentration in the range of 0.15–0.5% and said steel is carbonized or carbonitrided.

7. A toroidal-type continuously variable transmission, comprising:
   an input shaft rotatably supported;
   an input side disk rotatable together with said input shaft and including an inner surface formed as a concave surface having an arc-shaped section;
   an output side disk including an inner surface formed as a concave surface having an arc-shaped section, said output side disk being disposed concentrically with said input side disk in such a manner that said inner surface thereof is opposed to said inner surface of said input side disk;
   a plurality of trunnions respectively swingable about their associated pivot shafts disposed at twisted positions to said input shaft;
   a plurality of shift shafts respectively supported on said trunnions;
   a plurality of power rollers each including a peripheral surface formed as a spherical-shaped convex surface, said power rollers being rotatably supported on the peripheries of said shift shafts while they are disposed on the inner surfaces of said trunnions and are also interposed between and held by said input side and output side disks; and,
   a plurality of thrust rolling bearings respectively interposed between the outer peripheral surfaces of said power rollers and the inner surfaces of said trunnions for supporting thrust loads to be applied to said power rollers,
   wherein each of said thrust rolling bearings including:
      an inner ring raceway formed in the outer peripheral surface of said power roller; and
      an outer ring disposed inside said trunnion and having an outer ring raceway, wherein said outer ring is made of high carbon chromium bearing steel, including a carbon content in a range of 0.95% to 1.10%, and is carbonitrided.

8. A toroidal-type continuously variable transmission as set forth in claim 7, wherein said outer ring of said thrust rolling bearing is structured such that the surface carbon concentration thereof is set in the range of 0.95–1.4% and the surface nitrogen concentration thereof is set in the range of 0.05–0.4%.

9. A toroidal-type continuously variable transmission as set forth in claim 8, wherein said outer ring of said thrust rolling bearing is structured such that the surface hardness thereof is set at Hv650 or more.

10. A toroidal-type continuously variable transmission as set forth in claim 9, wherein said outer ring of said thrust rolling bearing is structured such that the retained austenite is in the range from 20% to 45%.

11. A toroidal-type continuously variable transmission as set forth in claim 10, wherein said outer ring of said thrust rolling bearing is structured such that the surface residual compressive stress is set in the range of −200 to −1800 MPa.

12. A toroidal-type continuously variable transmission as set forth in claim 9, wherein said power roller is made of steel for machine-structural purposes having a carbon concentration in the range of 0.15–0.5% and said steel is carbonized or carbonitrided.

* * * * *